(12) United States Patent
Bratton et al.

(10) Patent No.: US 7,670,085 B2
(45) Date of Patent: Mar. 2, 2010

(54) IN SITU IMMOBILIZATION OF SUBSURFACE CONTAMINATION

(75) Inventors: Wesley L. Bratton, Richland, WA (US); Joseph W Maresca, Jr., Sunnyvale, CA (US); William E. Lowry, Santa Fe, MN (US); Dawn Samara Kaback, Denver, CO (US)

(73) Assignee: Vista Engineering Technologies LLC, Kennewick, WA (US)

( * ) Notice: Subject to any disclaimer, the term of this patent is extended or adjusted under 35 U.S.C. 154(b) by 7 days.

(21) Appl. No.: 11/606,404

(22) Filed: Nov. 28, 2006

(65) Prior Publication Data
US 2007/0154267 A1  Jul. 5, 2007

Related U.S. Application Data

(60) Provisional application No. 60/740,306, filed on Nov. 28, 2005.

(51) Int. Cl.
*B09B 1/00* (2006.01)

(52) U.S. Cl. .............................................. 405/129.45
(58) Field of Classification Search ............ 405/129.45, 405/129.5, 129.6
See application file for complete search history.

(56) References Cited

U.S. PATENT DOCUMENTS

| | | | |
|---|---|---|---|
| 5,345,034 A * | 9/1994 | Corey | 405/129.45 |
| 5,421,672 A | 6/1995 | Ankeny et al. | |
| 5,591,115 A * | 1/1997 | Raimondi et al. | 405/129.5 |

* cited by examiner

*Primary Examiner*—John Kreck
(74) *Attorney, Agent, or Firm*—David H. Jaffer; Pillsbury Winthrop Shaw Pittman LLP

(57) ABSTRACT

Vertical migration of a plume of subsurface contamination in the vadose zone to the groundwater is prevented by forming and maintaining one or more desiccation layers in the vadose zone in or above a layer of contamination. Horizontal barrier layers are produced by injecting dry air at a specific elevation in one borehole and removing the air at another borehole. These horizontal layers act as an impermeable barrier to the vertical migration of dissolved contaminants.

24 Claims, 2 Drawing Sheets

Schematic of Dual Zone Dry Air Immobilization System

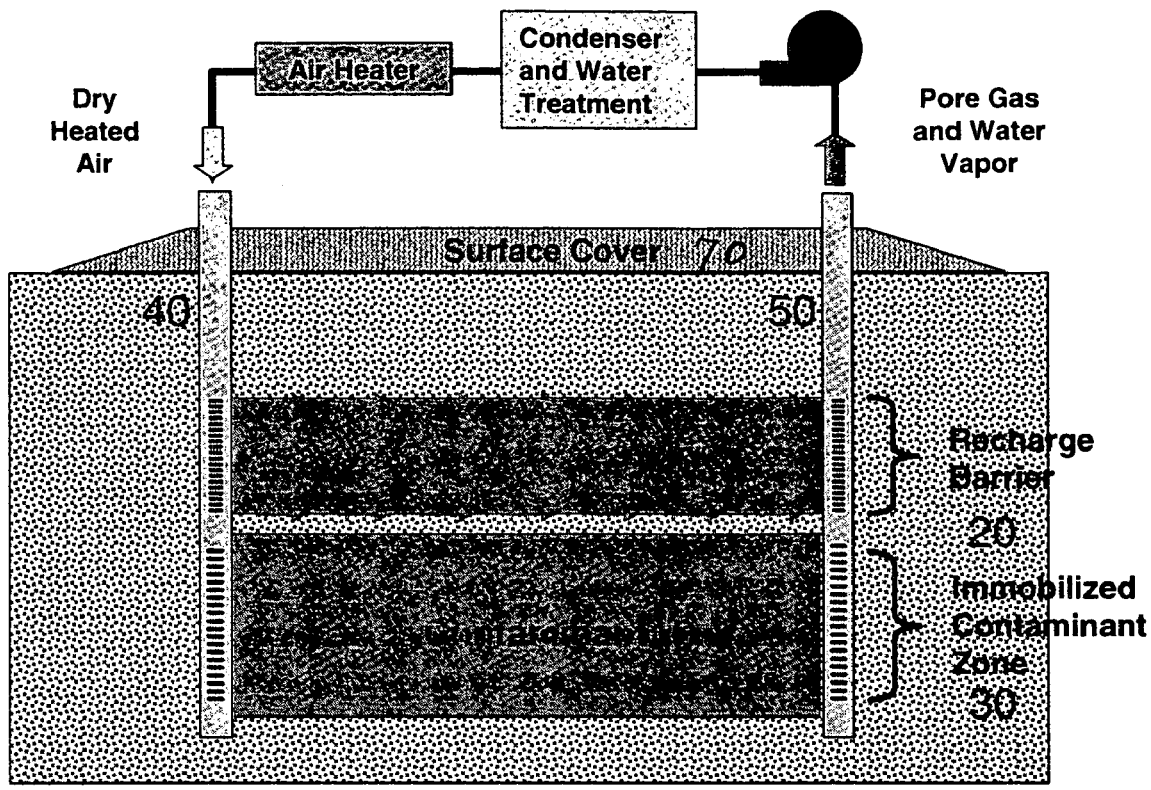
FIG. 1 – Schematic of Dual Zone Dry Air Immobilization System
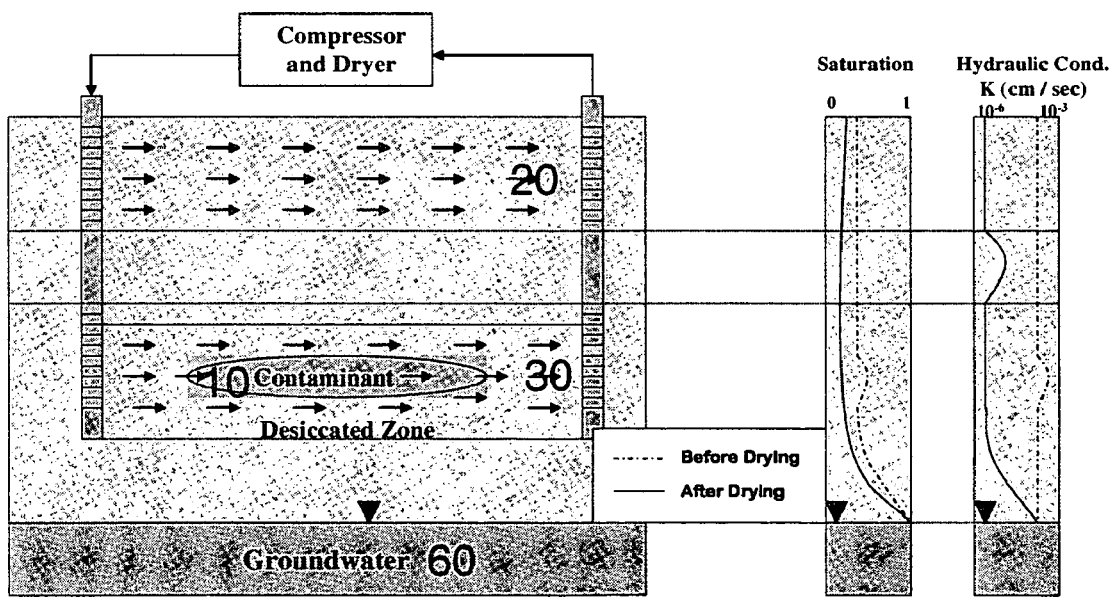
FIG. 2 – Simplified Depiction of Dry Air Immobilization Process

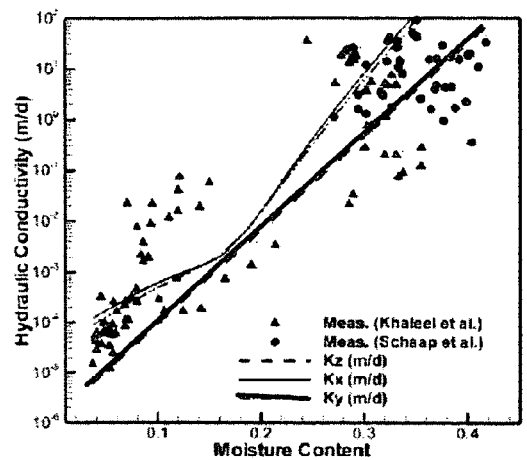
FIG. 3 – Changes in hydraulic conductivity due to moisture content changes for Hanford soils.
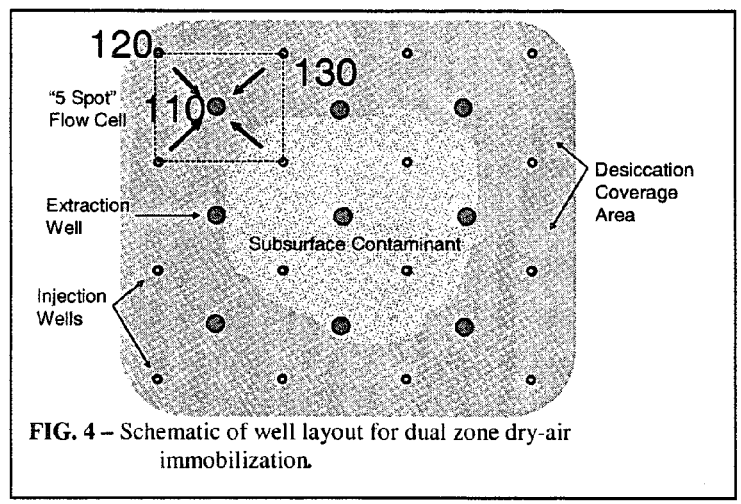
FIG. 4 – Schematic of well layout for dual zone dry-air immobilization.

IN SITU IMMOBILIZATION OF SUBSURFACE CONTAMINATION

RELATED APPLICATIONS

This application claims priority from U.S. Provisional application Ser. No. 60/740,306 filed Nov. 28, 2005.

BACKGROUND

1. Field of the Invention

The present invention relates to prevention of vertical migration of a plume of subsurface contamination in the vadose zone to the groundwater by forming and maintaining one or more desiccation layers in the vadose zone in or above the layer of contamination. These approximately horizontal desiccation layers act as an impermeable barrier to the vertical migration of dissolved contaminants.

2. Brief Description of Prior Art

The present invention is motivated by the need for deep vadose contamination remediation or immobilization to protect groundwater resources. A specific example includes the in situ remediation of high-level waste (HLW) contamination in the vadose zone found at the U.S. Department of Energy (DOE) sites such the Hanford Site and comprised of radionuclides such as uranium, plutonium, cesium, cobalt, strontium-90, and technetium$^{99}$ (Tc$^{99}$). Of these high-priority radionuclides, Tc$^{99}$ is the highest priority concern, due to its (1) long half-life and (2) high mobility. Tc$^{99}$ is important to the Hanford regulation community, because of potential health, safety, and environmental impacts. The Hanford threat as well as many other vadose contamination threats continue today due to both tank leaks and disposals to cribs and trenches, because the contamination remains in the vadose zone and is currently migrating downward towards the water table. Once this contamination reaches the because the contamination remains in the vadose zone and is currently migrating downward towards the water table. Once this contamination reaches the groundwater, the potential exists for significant contamination of the groundwater and eventually nearby surface water bodies. Groundwater clean-up is quite expensive, especially for radionuclides as well as other contaminants, and therefore it is desirable to immobilize the contamination and not allow it to reach the groundwater.

Historically, waste storage and disposal operations have left a significant inventory of contaminants (such as radionuclides) in the unsaturated zone. This vadose-zone inventory poses a significant risk to both the groundwater, and eventually surface waters, and therefore, is a high-priority concern for the site and regulatory officials. As a response to this growing threat, previous researchers have undertaken several studies of various remediation or mitigation strategies that could be used to stop or reduce groundwater contamination. These studies have looked at all types of barriers from permeable grout barriers to soil freezing techniques. In nearly all cases, the analyses conclude that these approaches will result in excessive installation costs to contain the known subsurface plumes, because these methods require close well spacing, and drilling in (1) the waste contamination, which may be radioactive, and (2) difficult subsurface conditions such as a deep vadose zone comprised of thick sections of various materials.

These alternative methods, which are summarized below, have been summarized by Kaback et al. (2005):

Vadose-Zone Perneable Reactive Barrier. Creation of a permeable reactive barrier in the vadose zone entails formation of a horizontal layer of either chemically or biologically reactive material to capture and stabilize the contaminant. It requires a comprehensive knowledge of contaminant transport rates in the vadose zone so that the barrier is active when the contaminants migrate through it. In addition, this barrier requires relatively accurate physical emplacement of material in a horizontal layer to reliably prevent contaminant transport to the water table, which is a similar challenge to the impermeable barrier emplacement (in-situ grouting) discussed below.

Vadose-Zone In-Situ Grouting. Demonstrations and field implementation of in situ grouting to contain waste in place have occurred at several sites using cement-based, viscous-liquid, and wax-based grouts. The major issues with use of this technology are the uniform delivery of the grouting fluid and validation of the effectiveness of the delivery. Applications to date have typically been either total volumetric encapsulation of the waste forms, or vertical/diagonal container wall formulations that have been proven to be flawed. A large-scale horizontal barrier has not been successfully emplaced at the scale and depth of this application. The number of boreholes required to ensure complete coverage of the grout is large and extremely costly for most applications.

Soil Flushing. Soil flushing is the in situ extraction of contaminants from the soil using water, an aqueous solution, or an organic solvent. It is applicable to a broad range of contaminants, including radionuclides. The lixiviant solution is infiltrated, sprayed, or injected into the contaminated soil zone and is followed by the down-gradient collection of the lixiviant containing the contaminants. The main obstacle for in situ soil flushing appears to be the great heterogeneity of the vadose-zone sediments, not only with depth, but also in lateral directions. The flushed lixiviant may not be contained and may cause impairment of uncontaminated volumes of the vadose zone and aquifer. When the vadose zone is thick, the infiltrated water may not fully drain for long periods of time, and therefore, require an on-site presence and active groundwater pumping program for the foreseeable future.

Energy-Based Methods. Various energy-based methods (or energy-based enhancements for desiccation) are theoretically applicable to contaminants in the deep vadose zone. These include various types of heating, as well as electro-osmosis or electro-kinetic methods. In the case of a deep vadose zone, these methods might be considered to facilitate vapor-phase water removal (or to induce the movement of liquid water and/or contaminants towards a collection system). In general, these methods will require extensive subsurface access and extremely close well spacing, which likely precludes applicability. A short summary of these methods is provided below.

Evapotranspiration covers are currently considered as the most practical solution to minimize groundwater contamination from existing deep vadose-zone contamination. However, even these covers are acknowledged to allow pore water above the acceptable regulatory levels to reach the water table and do not provide a desired redundant containment feature. The present invention provides a transformational advancement to enable immobilization and/or remediation of vadose zone contamination, where no current solution for the waste has been accepted by the regulatory community.

In U.S. Pat. No. 5,591,115, Raimondi et. al. teach a system and a method of blocking the vertical migration of subsurface contamination to the groundwater. The Raimondi system and method is comprised of (1) a drying system that is capable of removing about 75% or more of the saturation moisture from the aggregate particular substrate, and (2) a generally horizontal layer barrier layer formed and maintained below the region of contamination that has about no more than 25% of the soil moisture content of the particulate layer before drying. This dry layer acts as an impermeable barrier to the vertical migration of the dissolved contamination located above the barrier layer of dried material. The method and system of Raimondi only injects dry air into a horizontal subsurface layer below the plume of contamination. This application of a desiccation method is very specific to the vertical region below the contamination, and neither anticipates or describes the use of more than one desiccation layer used in combination or the value of positioning the layer in or above the contamination.

SUMMARY OF THE INVENTION

It is an object of this invention to provide a method and an apparatus for immobilization of contamination in the vadose zone. It is another object of this invention to provide a method and an apparatus for preventing the vertical migration of contamination in the vadose zone to the groundwater. It is still another object of this invention to provide a method and an apparatus for immobilizing or trapping contamination in the vadose zone and preventing its migration to the groundwater. It is still another object of this invention to provide a method and an apparatus for stopping naturally occurring recharge from entering a contaminated zone and carrying contamination to the groundwater.

The present invention mitigates the future threat to groundwater. The dual-zone dry-air immobilization system (DAIS) is preferably comprised of at least two dry subsurface zones, both of which work much like a sponge. The two desiccated zones are created using the same set of wells. The primary zone is located within the plume and will dry the contaminated region and immobilize the contaminants, thus preventing further vertical migration of the contaminants. This primary zone provides an environment allowing geochemical stabilization through precipitation of waste species. The secondary zone desiccates the soils above the contaminants to prevent natural recharge, and ensures no additional infiltration of fluids penetrate the contaminated zone, which could mobilize and carry contaminants to greater depths. The DAIS system can be used in conjunction with a surface infiltration barrier (i.e. a cover) to further ensure minimization of infiltration. If a surface barrier is not possible or plausible, the DAIS will be operated periodically to maintain desiccation conditions. The DAIS method can be implemented using or modifying existing vertical wells or by drilling new vertical wells.

The single-layer desiccation approach described by Raimondi has never been implemented, and requires the desiccation layer to be fairly deep. The present dual-zone approach is more proactive and less costly to implement because the desiccation layers are shallow. The method and apparatus of the present invention capture the water that will drive the contamination downward before it reaches the contamination, and also directly dries and minimizes any downward migration of the contamination within the plume itself.

The DAIS provides the following benefits: (1) an effective method for contaminant immobilization that can be used in conjunction with surface covers to significantly reduce the risk of contaminants, especially radionuclides, reaching receptors at levels above regulatory limits; (2) two levels of protection through elimination of infiltration from above the contaminated zone and immobilization of contaminants within the zone; (3) it can be applied over large areas with contaminated vadose-zone media much less expensively than competing containment or stabilization technologies; (4) it is broadly applicable to remediate many types of contamination problems, including tank or pipe leaks, or disposal means such as cribs and lagoons; (5) it is non-chemically specific and can be used for a wide variety of contaminants and treats all contaminants simultaneously; (6) it is applicable primarily to sites with thick vadose zones containing contaminants; (7) it is based upon control of lateral flow, building upon the natural anisotropic characteristics of the vadose-zone media; (8) contaminant mobility is significantly reduced by aggressive alteration of hydraulic conductivity; and (8) no liquids are introduced to the subsurface in this process, so there is little or no potential to mobilize contaminants.

The method and apparatus of the present invention prevent the vertical migration of a plume of subsurface contamination in the vadose zone to the groundwater by forming and maintaining one or more desiccation layers in the vadose zone that is located in or above the layer of contamination. These horizontal layers effectively act as an impermeable barrier to the vertical migration of dissolved contaminants. The preferred embodiment of the present invention (DAIS) is to produce two horizontal layers, one above the contamination plume and one in the contamination plume. These layers work much like a sponge and are produced by injecting dry air at a specific elevation in one borehole and removing the air at another borehole. The upper dry layer will capture any natural recharge and eliminate further downward migration of moisture, which could mobilize and carry contaminants to greater depths. The lower zone will dry the contaminated region, which will immobilize the contaminants in place and prevent further downward migration. An alternative embodiment of the present invention is to produce a single desiccation barrier, either above or in the contamination plume. The method will work even if the plume is being actively fed from the vertical migration of waste contamination or water from above, which may originate at or near the surface, or in a surface or subsurface container (e.g. a tank, pipe, crib, or lagoon). This method is particularly effective when contamination covers large areas and/or when the contamination is particularly dangerous or hazardous materials (e.g. radionuclides). If a surface barrier (i.e. a cover) is not possible or plausible to prevent infiltration, the DAIS will be operated periodically to maintain desiccation conditions. The DAIS method can be implemented using or modifying existing vertical wells or by drilling new vertical wells.

IN THE DRAWING

FIG. 1 illustrates a Dual Zone Dry Air Immobilization System (DAIS);

FIG. 2 is a simplified depiction of a dry air immobilization process;

FIG. 3 illustrates changes in hydraulic conductivity due to moisture content changes; and FIG. 4 illustrates a schematic of well layout for a Dual Zone Dry Air Immobilization System.

DESCRIPTION OF THE PREFERRED EMBODIMENT

The present invention prevents the vertical migration of vadose zone contamination whatever the form (organics, metals, and radionuclides such as $Tc^{99}$) from migrating down to the groundwater table by trapping the contaminants within their current location, and thus delaying or eliminating their arrival at the water table. While the method and apparatus of the present invention is motivated by the contamination problem at the Hanford Site, it is by no means limited to this site or this application, and is intended to address any type of contamination in the vadose zone at any site.

With reference to FIGS. 1 and 2, the DAIS uses dry-air desiccation to immobilize radionuclides and other contaminants, 10, preventing them from reaching the water table. As illustrated in FIGS. 1 and 2, the preferred embodiment of the present invention uses two dry subsurface zones, 20 and 30, both of which work much like a sponge. The upper dry layer, 20, captures any natural recharge and eliminates further downward migration of moisture, which could mobilize and carry contaminants to greater depths. The lower zone, 30, dries the contaminated region, which immobilizes the contaminants in place and prevents further downward migration. These barriers are created by injecting hot air in the subsurface from an injection well, 40, and an extraction well, 50. The ultimate objective is to prevent any downward migration towards the groundwater table, 60. The DAIS system can also be used in conjunction with a surface infiltration barrier 70 to further ensure minimization of infiltration. If a surface barrier is not possible or plausible, the DAIS can be operated periodically to maintain desiccation conditions.

As noted above, the DAIS will capture water that will drive the contamination downward before the water reaches the contamination, and it also directly dries and minimizes any downward migration of the contamination within the plume itself.

The DAIS utilizes artificial drying of the geologic media in the unsaturated zone to reduce its ability to transport contaminants, such as radionuclides, via pore water (FIG. 2). The treatment zones are formed by an active ventilation process. When the moisture content of unsaturated media is reduced, the unsaturated hydraulic conductivity is also reduced. In many western soils, the reduction in unsaturated hydraulic conductivity can be disproportionately large for a given change in water content. Applying this to two zones, above and within the contaminated zone, precludes further downward migration of contaminants in the liquid pore water. This approach applies redundancy to a method, which has the potential to reduce the risk of groundwater contamination due to the large radionuclide inventory in the vadose zone.

Because DAIS controls the vapors and liquids within the pores in the contaminant zone, it also influences the geochemistry and mineralogy of the solid and liquid media. Geochemical alteration has not been adequately examined in any evaluation of subsurface desiccation, such as for surface evapotranspiration barriers or recent patents related to desiccation-based barrier systems for tank leaks. See U.S. Pat. Nos. 5,421,672 and 5,591,115. However, moisture removal from the vadose zone may potentially affect mobility of metals and radionuclides in four ways, which would further enhance the functionality of the DAIS: (1) As moisture is removed, solutes in vadose-zone pore water become more concentrated and saturation with respect to mineral phases may be exceeded. Contaminant metals and radionuclides may be stabilized by precipitation or co-precipitation in these mineral phases. (2) Likewise, chemical changes induced by moisture removal may promote enhanced sorption of contaminants. (3) Sorption may also be enhanced by the increase in available sorption sites accompanying substantial precipitation of high surface-area phases. (4) Precipitation of mineral phases may occlude adsorbed contaminants from interaction with groundwater—such occlusion would limit continued migration. Additionally, the configuration described below allows a potentially high degree of control over the vapor composition surrounding the waste, which allows tailoring the vapor/liquid geochemistry to further enhance immobilization.

The DAIS incorporates two treatment zones: (1) a primary treatment zone located in the contaminated media to immobilize the contaminants (and allow potential treatment of the pore water to produce a more favorable geochemical environment, further reducing contaminant mobility), and (2) a second drying zone located above the contaminated media to act as a recharge barrier, which prevents further infiltration into the contaminated media. These features can be implemented in concert with a surface cover at the site, providing redundancy for high risk and highly mobile contaminants. The addition of the second drying zone provides "defense in depth" through the use of multiple barriers and synergistic modalities.

The DAIS removes water from the vadose zone through injection of dehumidified air and heat; this results in hydraulic isolation of the target zones, which minimizes undesired flow and produces contaminant stabilization. Because these controls are generated in place, their geometry and performance is determined by the natural geologic setting (e.g. layering), and the emplacement mode(s). The movement of water in layered heterogeneous vadose systems has been extensively studied and is predictable based on capillary and gravitational driving forces.

The DAIS both isolates and stabilizes HLW constituents that have entered the vadose zone at contaminated sites and minimizes transport to the groundwater.

Soil gas at depth is nearly saturated with water vapor (typically above 99% relative humidity), even in very dry soils. Adding energy to boost the vapor pressure of the water and then displacing this with lower humidity air will result in the extraction of water from the soil pores. The classic vapor extraction process can accomplish this if the extraction well is supplemented with injection of fresh (and possibly heated and/or dried) air from the atmosphere in a distant well or wells. FIG. 2 illustrates a simple two-well configuration. Dry air is supplied to the soil through forced injection. The desired flow field is established by the extraction well illustrated in the figure. Before the dry air front from the injection well reaches the extraction well, the extracted air is initially very humid. The desiccation zone is established in the flow field as liquid water evolves from the soil pores, diffuses into the flowing air stream, and is swept away in vapor form. The drying process is influenced by: the flow rate of the air through the soil volume; the capacity of the air to remove water vapor (water vapor saturation of the incoming air); the rate of energy addition to the soil water through two sources: (1) energy carried with the incoming air (such as heated air) and (2) heat conduction from adjacent soil as the target zone cools due to the water's phase change; the accessibility of the pore liquid to the air flow field (much as the standard limits of connected and small pores in soil vapor extraction processes); and the rate with which adjacent pore water (including infiltration water) is drawn into the desiccated zone.

The key function of the DAIS is to dry the soil both within and above the contaminated zone to create a barrier to moisture movement. Hydraulic property data shown in FIG. 3 demonstrate the relationship between moisture content and hydraulic conductivity. The solid line, 100, is the vertical unsaturated conductivity derived by spatial moment analysis of the infiltration tests by Yeh et al. (Yeh Tian-Chyi J., M. Ye and R. Khaleel, 2005, *Estimation of effective unsaturated hydraulic conductivity tensor using spatial moments of observed moisture plume*, Water Resources Research, Vol. 41, W03014, doi:10.1029/2004WR003736). Note that a volumetric moisture content change from 0.2 to 0.1 yields a reduction in hydraulic conductivity from $10^{-2}$ to $10^{-4}$ m/d. This reduction in hydraulic conductivity, particularly under very low infiltration conditions, will significantly reduce vertical transport and can essentially immobilize dissolved contaminants.

Airflow patterns will be radial, surrounding a long screened zone of the typical vapor well. Naturally occurring anisotropic permeability, such as that in fluvial/glacial deposits, will tend to favor horizontal flow over vertical flow (i.e. the horizontal permeability is greater than the vertical permeability). The observed layering of fine-grained and coarse-grained materials adds to this effect, resulting in enhanced horizontal fluid flow. Multiple wells will be required to optimize the flow field and achieve the desired moisture removal rate. The most likely configuration is illustrated in FIG. 4 with a central extraction well, 110, surrounded by four dry-air injection wells, 120. The optimal well spacing is a function of vadose-zone permeability, well diameter, desiccation-layer thickness and confining characteristics, and the desired lateral extent of the desiccation zone. If four injection wells are used for each extraction well, the "5-spot" pattern, 130, which can be replicated to cover large areas in a rectilinear grid, ensures nearly total capture of the injected air as illustrated in FIG. 4.

Vadose-zone desiccation is well suited when: (a) The air permeability of the subsurface media is high, due to the coarse and granular nature of the majority of the glacio-fluvial deposits. (b) The extensive coarse/fine layering results in macroscopic anisotropic permeability, highly favoring horizontal flow of air, which will aid control of the air-flow system within the target zone. (c) The relatively deep vadose zone provides sufficient layer depth both above and below the contamination to allow design flexibility. (d) The infiltration rate is very low, which reduces the demand on the desiccation maintenance phase.

The dual zone dry-air immobilization system is applicable at many sites containing leaked wastes from a variety of sources, where the bulk of the contamination still remains in the vadose zone and a thick, relatively dry vadose zone exists. Any location where there is a relatively thick, permeable vadose zone containing contaminants is a potential target for the system.

The DAIS can be relatively easy and cost-effective to implement, because it can build upon the existing infrastructure of existing monitoring wells. In the tank farm environment at the Hanford Site, each tank is currently surrounded by a series of 8 to 10 dry wells that are used for gamma logging. If necessary, these wells can easily be extended to a depth that captures the leading edge of the existing tank leak plume. The wells can then be perforated within the two target zones of interest, one within and one above the zone of contamination. Given that the medium to be transported between wells is dry air, the well spacing can be quite large (e.g. several hundred feet), reducing the need for a large number of wells.

For applications that relate to cribs and trenches, the same DAIS design applies. The upper boundary can be established immediately under the disposal trench or crib and the lower desiccated zone will be within the existing contamination. Both the upper and lower desiccated zones can be created in a single well. Packers can be utilized if different flow rates and control are desired on the two zones. Monitoring can be implemented using a variety of technologies from simple moisture monitoring of the extraction air to more robust cross-hole and surface geophysical systems that can be operated remotely.

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A method for preventing vertical migration of a subsurface contamination plume in the vadose zone to the groundwater comprising the steps of forming at least two desiccation layers in the vadose zone, including a first desiccation layer in the plume and a second desiccation layer above the plume, wherein the desiccation layers are formed by using a drying method to remove saturation moisture from the desiccation layers.

2. The method of claim 1 wherein the drying method uses a blower to introduce a gas into the vadose zone and a pump to withdraw the gas from the vadose zone.

3. The method of claim 1 using two desiccation layers.

4. The method of claim 1 wherein at least one desiccation layer is maintained by using the drying method in an intermittent manner after the desiccation layer is formed.

5. The method of claim 1 wherein the drying method includes at least two boreholes, and a gas is introduced into the vadose zone at a first specified elevation in a first borehole and the gas is removed at a second specified elevation in a second borehole.

6. The method of claim 5 wherein the specified elevation is the same in both boreholes.

7. The method of claim 5 wherein the gas is air.

8. The method of claim 5 wherein where the gas is dried air.

9. The method of claim 5 wherein where the gas is heated air.

10. The method of claim 5 wherein where the drying method includes at least three boreholes.

11. The method of claim 5 wherein the number of boreholes used to introduce the gas is different than the number of boreholes used to withdraw the gas.

12. The method of claim 5 wherein the drying method uses a blower to introduce the gas into the vadose zone at at least one borehole and a pump to withdraw the gas from at least one borehole.

13. The method of claim 12 wherein a plurality of blowers and pumps are used.

14. The method of claim 10 wherein at least one blower is used to introduce the gas into the vadose zone at a first specified elevation in at least one borehole and at least two pumps are used to withdraw the gas from the vadose zone at specified elevations from at least two boreholes.

15. The method of claim 10 wherein at least two blowers are used to introduce the gas to the vadose zone at specified elevations in at least two boreholes and at least one pump is used to withdraw the gas from the vadose at a specified elevation from at least one borehole.

16. A method for preventing vertical migration of a subsurface contamination plume in the vadose zone to the groundwater comprising the steps of forming at least three desiccation layers in the vadose zone, including a first desiccation layer above the plume, a second desiccation layer in the plume, and a third desiccation layer below the plume, wherein the desiccation layers are formed by using a drying method to remove saturation moisture from the desiccation layers.

17. The method of claim 16 wherein the drying method uses at least two boreholes, and a gas is introduced into the vadose zone at a first specified elevation in a first borehole and the gas is removed at a second specified elevation in a second borehole.

18. The method of claim 16 wherein the drying method uses a blower to introduce the gas into the vadose zone and a pump to withdraw the gas from the vadose zone.

19. The method of claim 16 wherein at least one desiccation layer is maintained by using the drying method in an intermittent manner after the desiccation layer is formed.

20. A method for preventing vertical migration of a subsurface contamination plume in the vadose zone to the groundwater comprising the steps of forming at least two desiccation layers in the vadose zone, including a first desiccation layer in the plume and a second desiccation layer below the plume, wherein the desiccation layers are formed by using a drying method to remove saturation moisture from the desiccation layers.

21. The method of claim 20 wherein the drying method uses at least two boreholes, and a gas is introduced into the vadose zone at a first specified elevation in a first borehole and the gas is removed at a second specified elevation in a second borehole.

22. The method of claim 20 wherein the drying method uses a blower to introduce the gas into the vadose zone and a pump to withdraw the gas from the vadose zone.

23. The method of claim 20 wherein at least one desiccation layer is maintained by using the drying method in an intermittent manner after the desiccation layer is formed.

24. The method of claim 20 using two desiccation layers.

* * * * *